July 21, 1936.  C. J. FANCHER  2,048,603

TOOL

Filed Dec. 18, 1935

INVENTOR.
Charles J. Fancher
BY Walter C. Ross
ATTORNEY.

Patented July 21, 1936

2,048,603

UNITED STATES PATENT OFFICE 2,048,603

TOOL

Charles J. Fancher, Chatham, N. J., assignor to Landon P. Smith, Inc., Irvington, N. J., a corporation of New Jersey Application December 18, 1935, Serial No. 55,094

6 Claims. (Cl. 145—47)

This invention relates to improvements in tools and is directed more particularly to improvements in tools for scraping wood and the like.

It is one of the principal objects of the invention to provide a tool including a novel handle and coacting blades with the blades so arranged that they may be removably associated with the handle.

Another object of the invention is the provision of a tool having a handle so arranged that the blades may be removably associated therewith either in operative position or in an inoperative position. That is to say, a handle of novel form is so arranged that a pair of blades may be associated therewith either in an operating position wherein the working edges of the blades are in working position or an inoperative, or safety, position wherein the working edges of the blades are protected against injury and one handling the tool is not likely to be injured by said edges. Also the tool is so formed that the blades may be used in various working positions.

A further object of the invention is to provide a wood scraping tool having a pair of similar and separable blades which are provided with inter-engaging parts such as keys and sockets to hold the blades in nested relation and facilitate the ready insertion and removal of the blades as a unit in and from the handle. In this way the blades may be nested and inserted in the handle with their working edges disposed in opposed directions and the coacting keys and sockets are arranged so that similar blades constitute a pair as distinguished from an arrangement where a right and left hand blade form a pair.

According to the preferred form of the invention, the blades are so constructed and arranged that they may be used in pairs in back to back relation as a unit and the unit is receivable in the handle in either operative or non-operative position. Also by means of the novel construction and arrangement, hereinafter to be more fully described, it is possible to use but one of the blades of the pair if desired and this may be inserted within the handle and held in place by novel means.

Various other novel features and advantages of the invention will be more fully hereinafter described in such a way as to facilitate a clear understanding of the invention and reference will be had to the accompanying drawing wherein.

Referring now to the drawing more in detail, the invention will be fully described, it being understood that similar numerals of reference are used to indicate corresponding parts.

A handle 2 is provided which may be made of any material desired such as, for example, wood. Such material is preferably relatively inexpensive and of such a nature that it may be easily and readily formed and finished in various styles for grasping in the hand or hands.

Figure 1:
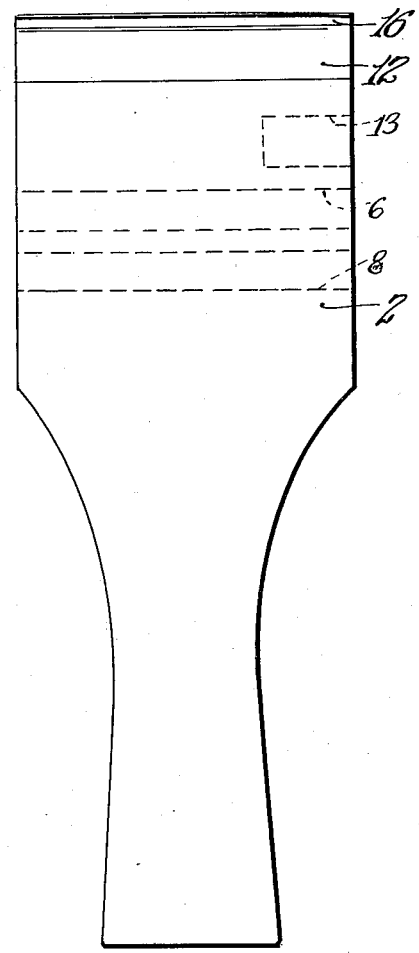
Fig. 1 is a front elevational view of a tool embodying the novel features of the invention.
Figure 2:
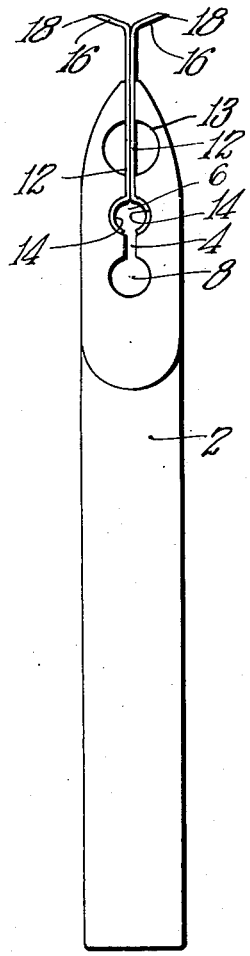
Fig. 2 is a side elevational view of the tool shown in Fig. 1.

What may be called the forward working end of the handle is provided with a blade-receiving slot 4 which, as shown in Fig. 2, extends inwardly from the end face of the handle and transversely between opposite sides thereof. Transverse bores 6 and 8 are disposed at some distance from the forward end of the handle and in spaced relation as shown. These bores extend from opposite side edges of the handle, and the blade-receiving slot 4 as may be seen leads thereinto.

Figure 3:
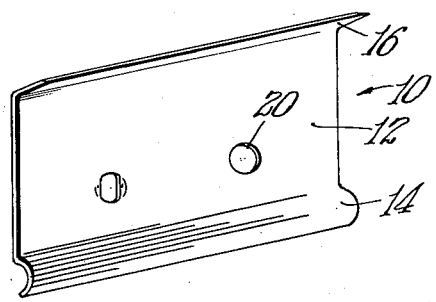
Fig. 3 is a perspective view of one of the blades of the invention.

A pair of blade members 10 is provided and each is preferably the exact counterpart of the other. Each blade 10 consists of a relatively flat sheet of steel or the like and, as shown in Fig. 3, formed to have a body portion 12, a keeper 14 at one end thereof, and an end portion 16 turned outwardly at a suitable angle at the opposite end thereof. The part 16 is sharpened to provide what may be called a working edge 18.

The keeper 14, as shown in the present preferred embodiment of the invention, is slightly curved or rounded so as to conform to the sides of the bores 6 and 8. At least, the keepers are preferably adapted to abut a portion of the bore in order to retain the blade or blades in the slot of the handle and prevent longitudinal movement thereof.

Each of the blades 10 is provided with at least one socket such as 20 and a key for co-operating with a socket 20 of its other blade. The keys may be formed by upsetting a portion of the body portion 12 of the blade so as to provide a protruding part 22 in one side and a depression 24 in the other. Or, if desired, the keys may be formed by securing to the body in some suitable manner, as by welding, a projection member.

The sockets 20 may consist of indentations in the body portions of the blades or apertures therethrough, and these may be formed by drilling, stamping, punching, or some other suitable operation. In any event, the sockets are formed to receive the protruding part 22 of one of the blades.

It will be seen that the sockets and keys are arranged so that a pair of blades may be readily nested in back to back relation with a key of one blade in the socket of the other so that the blades have their corresponding faces in contiguous relation for inserting in a handle as a unit. That is, when two identical blades are disposed in the slot 4 of the handle and in back to back relation they constitute a unit with their respective working edges turned in opposite directions.

In this way I obviate the necessity of having right and left hand blades or different blades to constitute a unit. The structure is not only in this way easier to set up but economy in manufacture is facilitated. Furthermore, it is possible, for shipping and storage purposes, to place a plurality of the blades on top of one another with the projections 22 of each blade received in the depression 24 of the preceding blade.

A unit constituted of blades 10 paired up, with the key of one disposed in the socket of the other, may readily be slipped into the slot 4 with the keepers 14 in one of the transverse bores 6 or 8. The blades are held against relative movements and against longitudinal movement in the normal scraping operation by means of these keepers. Yet when it is desired to replace either or both of the blades 10 they may be readily moved as a unit transversely of the handle and separated.

As will be obvious, one of a pair of blades which may require replacement may be then discarded and replaced by another. In this way, it is not only possible to at all times have two working edges but, it is unnecessary, where it is desired to have a new working edge, to replace a pair of fixed-together blades, thereby making for economy.

It is possible to hold one only of the blades in the handle. This may be desirable in some instances as where the tool is used in corners and the like or where the blade is used for scraping in such places that the presence of another blade might interfere with the manipulation of the tool or come into contact with adjacent woodwork and cause injury thereto. A key or keys of a single blade and the body portion of the blade may sufficiently fill up the slot and serve the function of holding the blade against movement relative to the handle.

The blades 10 are, according to this invention, of such a length and the lowermost transverse bore 8 is so spaced from the forward end of the handle that when the blades are disposed in the slot 4 with the keepers 14 abutting the inner surfaces of the bore 8, the working edge portions 16 are disposed closely adjacent the end of the handle. This may be called the inoperative safety position of the blades.

Figure 5:
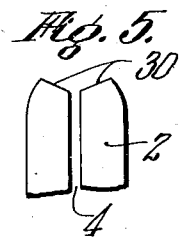
Fig. 5 is a partial side elevational view of a modified form of handle of the invention.
Figure 4:
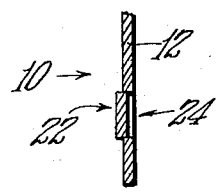
Fig. 4 is a partial sectional elevational view taken through one of the keys of the blade shown in Fig. 3.

According to one form of the invention, as shown in Fig. 5, the handle 2 may be so formed that its forward end has inclined surfaces 30 at either side of the slot 4. That is, the surfaces 30 extend upwardly and away from the forward entrance to the slot 4 on an angle to the vertical which is substantially equal to the angle of the portions 16 of the blades to their respective body portions 12.

The blades 10 may be moved transversely of the slot 4 by pressing on them and to facilitate this a depression such as 13 may be provided in one or both of the side edges of the handle. This depression is preferably relatively larger than the bores 6 and 8 and when the handle is held by the hand the thumb or a finger may be pressed into the depression so that endwise pressure may be applied to the side edges of the blades. Or, of course, an implement may be used for urging the blades outwardly.

The blades may, of course, be removed from a safety or inoperative position and reinserted so that the keepers are disposed in the upper bore 6. In this position the working edges 18 of the blades are in operative position and, of course, the parts may be arranged so that one blade only is in an operative position while the other is in an inoperative position. Or, as stated above, one blade only may be used.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

1. A wood scraper of the class described comprising in combination, a handle having a transverse slot extending inwardly from an end thereof and spaced transverse bores intersecting said slot and disposed inwardly from said end, a pair of blades having main body portions with angularly disposed working portions and keepers at opposite ends thereof, the said body portions of the blades being receivable and removable transversely in and from said slot with the keepers disposed in either one of said bores whereby the working portions of the blades are disposed either adjacent or at a distance from the end of the handle and are held against longitudinal movement relative to said handle in either position, the said blades being provided with engageable means which when engaged and within said slot prevent relative movements of said blades.

2. A wood scraper of the class described comprising in combination, a handle having a transverse slot extending inwardly from an upper end face thereof and spaced bores intersecting said slot at different distances from said face, a pair of substantially rigid metal blades each having a main body portion with angularly disposed working portions at the upper ends thereof and keepers at the lower ends thereof, the body portions of the blades being receivable in the slot and the said keeper portions being receivable in either of said bores whereby the blades may be disposed in said handle with the working portions thereof adjacent said end face of the handle in safety position or at a distance therefrom in operative position.

3. A wood scraper of the class described comprising in combination, a handle having a transverse slot extending inwardly from an upper end face thereof and spaced bores intersecting said slot at different distances from said face, a pair of blades each having a main body portion with angularly disposed working portions at the upper ends thereof and keepers at the lower ends thereof, the body portions of the blades being receivable in the slot and the said keeper portions being receivable in either of said bores whereby the blades may be disposed in said handle with the working portions thereof adjacent said end face of the handle in safety position or at a distance therefrom in operative position, the said blades being provided with interfitting means preventing relative movements thereof when in said slot and the said keepers and bores preventing movement of the blades longitudinally of the handle, and the said handle being provided with a depression to expose side edge portions of the blade when in said slot to facilitate contacting with said edges for moving the blades transversely of the slot.

4. A wood scraper of the class described comprising in combination, a handle having a transverse slot extending inwardly from an upper end face thereof and spaced bores intersecting said slot at different distances from said face, said end face of the handle being angularly disposed relative to said slot, a pair of blades each having a main body portion with angularly disposed working portions at the upper ends thereof and keepers at the lower ends thereof, the body portions of the blades being receivable in the slot and the said keeper portions being receivable in either of said bores whereby the blades may be disposed in said handle with the working portions thereof adjacent said end face of the handle in safety position or at a distance therefrom in operative position, the said blades being provided with interfitting means preventing relative movements thereof when in said slot and the said keepers and bores preventing movement of the blades longitudinally of the handle.

5. A wood scraper of the class described comprising in combination, a handle having a transverse slot extending inwardly from an upper end face thereof and spaced bores intersecting said slot at different distances from said face, said end face of the handle being angularly disposed relative to said slot, a pair of blades each having a main body portion with angularly disposed working portions at the upper ends thereof and keepers at the lower ends thereof, the body portions of the blades being receivable in the slot and the said keeper portions being receivable in either of said bores whereby the blades may be disposed in said handle with the working portions thereof adjacent said end face of the handle in safety position or at a distance therefrom in operative position, the said blades being provided with interfitting means preventing relative movements thereof when in said slot and the said keepers and bores preventing movement of the blades longitudinally of the handle, and the said handle being provided with a depression to expose side edge portions of the blade when in said slot to facilitate contacting with said edges for moving the blades transversely of the slot.

6. A wood scraper of the class described comprising in combination, a handle having a transverse slot extending inwardly from an end thereof and a transverse bore intersecting the slot at a distance from the said end, a pair of substantially alike blades each having main body portions receivable in the slot, keepers receivable in the bore and angularly disposed working end portions, each blade having a socket and a key at opposite ends, the key of one blade being receivable in the socket of the other whereby the blades are held in said slot against relative movement with the working portions thereof disposed away from one another.

CHARLES J. FANCHER.